United States Patent Office 3,325,300
Patented June 13, 1967

3,325,300
REFRACTORY BODIES AND COMPOSITIONS AND METHODS OF MAKING THE SAME
Douglas C. Wise, North Tonawanda, and Leo C. Ehrenreich, Buffalo, N.Y., assignors to The Carborundum Company, Niagara Falls, N.Y., a corporation of Delaware
No Drawing. Filed Jan. 6, 1964, Ser. No. 336,070
17 Claims. (Cl. 106—57)

This invention relates to novel refractory compositions and to articles and shapes made therefrom. It also pertains to methods for making such articles and shapes.

There is a strong, continuing demand for new and better refractory compositions, articles and shapes that will withstand the ever increasing and exacting demands with regard to strength, hardness, density, resistance to oxidation at high temperatures and other conditions that bring about the deterioration and failure of conventional refractory bodies. While refractory materials generally are considered to have properties which make them suitable for high temperature applications, each class of refractory materials which may be applicable to high temperature uses has at least one inherent weakness.

Thus, interstitial carbides and borides lack resistance to oxidation, while oxides suffer from the disadvantages of poor thermal shock resistance and low strength at high temperatures. Silicides, which generally are more resistant to oxidation than either carbides, borides or oxides, lack refractoriness, melting or creeping at temperatures below about 2000° C.

In order to overcome these inherent weaknesses, it has been suggested in the prior art that a combination of the oxidation resistance of a silicide with the refractoriness of an oxide or a boride would provide suitable high temperature oxidation resistant bodies. Several of such combinations have been suggested including zirconium dioxide-zirconium disilicide, zirconium diboride-pentazirconium trisilicide, zirconium diboride-tungsten disilicide, and the like. Of all the combinations suggested, a composite of zirconium diboride-molybdenum disilicide was found to have the best resistance to oxidation and thermal shock. While this composition has good oxidation resistance and excellent resistance to thermal shock, the use of this composition as a structural material at high temperatures has not been feasible since at high temperatures, that is temperatures of about 1800° C. and above, the strength of the material decreases rapidly thereby making it unsuitable for many applications.

An object of the present invention is to provide improved refractory compositions having highly satisfactory properties with respect to strength, hardness, density and resistance to oxidation.

Another object of the present invention is to provide improved refractory compositions having excellent resistance to oxidation and good strength at high temperatures.

Another object of the invention is to provide raw batch mixtures which can be shaped into refractory bodies having excellent resistance to oxidation and good strength at high temperatures.

Another object of the invention is to provide improved refractory bodies which are suitable for use as structural material at high temperatures.

Another object of the invention is to provide improved refractory articles and shapes characterized by excellent resistance to oxidation and good strength at high temperatures.

A further object of the invention is to provide methods for forming refractory articles and shapes from the novel composition of this invention.

Other objects and advantages of the invention will be apparent from the following description of the invention and the novel features will be particularly pointed out hereinafter in the appended claims.

It has now been discovered that the oxidation resistance and strength at high temperatures of bodies made from a zirconium diboride-molybdenum disilicide composition can be greatly improved by the addition of boron carbide to the composition. Refractory bodies made from this novel composition have excellent resistance to oxidation, good thermal shock resistance and good strength at temperatures as high as 1500° to 2000° C. and above. This combination of properties makes it possible to use the composition of this invention in the fabrication of structural materials for use at such high temperatures. In addition, this novel composition may also be used as a protective agent for another oxidizable material. Thus, this composition may be applied as a coating to refractory substrate materials such as zirconium carbide, graphite, silicon carbide, and so forth; to refractory foams such as carbides of zirconium, tantalum, titanium, tungsten, niobium and silicon; and to stainless steel.

The improved refractory composition of this invention comprises a mixture of from about 70% to about 94% by weight of zirconium diboride, from about 5% to about 20% by weight of molybdenum disilicide and from about 1% to about 10% by weight of boron carbide. Expressed in mole percentages, the composition of this invention comprises from about 85 to 95 mole percent $ZrB_2$ and from about 5 to 15 mole percent $MoSi_2$ to which about 2.0 to 10.0 parts by weight of boron carbide per 100 parts by weight of zirconium diboride has been added.

According to the invention, refractory articles and shapes may be made from these compositions by either hot pressing or cold pressing and sintering techniques. Thus, an intimate mixture of zirconium diboride, molybdenum disilicide and boron carbide may be hot pressed at pressures above about 2000 p.s.i. and temperatures above about 2000° C., or may be cold pressed at pressures up to 50,000 p.s.i. and sintered at temperatures above about 2000° C. In the hot pressing process the intimate mixture of materials is placed in a graphite mold having a movable graphite plunger and hot pressed by simultaneously subjecting the mold and contents to heat and pressure, the heat and pressure being maintained until the downward movement of the plunger ceases, indicating that maximum density has been obtained. This time period may range from about 15 minutes to about one hour at the maximum temperature. In the sintering process, sintering temperatures are maintained for periods ranging from 1 to 10 hours. Both the hot pressing and sintering processes are carried out in an inert or non-oxidizing atmosphere, such as argon, helium, and the like. In practicing the present invention, preferred pressures and temperatures for the hot pressing technique are in the range of about 2000 to 4000 p.s.i. and 2000 to 2300° C. For the cold pressing and sintering technique preferred pressures and temperatures are in the range of 4000 to 6000 p.s.i. and 2100 to 2350° C. Pressure does not appear to be a critical factor in either the hot pressing or sintering processes, other than as necessary to obtain compaction, and both higher and lower pressures may be employed. In forming refractory bodies of this invention by hot pressing techniques, either a conventional or slightly modified hot pressing procedure may be used with satisfactory results. Thus, according to conventional hot pressing methods the pressure is applied at maximum temperature, maintained for the period of time required to form a body of the desired density and then allowed to slowly subside while the furnace cools. According to the modified hot pressing technique of this invention the procedure described above is modified in that the pressure is completely removed prior to cooling the furnace. When a cold pressing and sintering technique is used to form the refractory bodies of this invention, a conventional temporary binder such as organic resin type binders may be added to the raw mix composition. Suitable temporary binders include, for example phenolic resins and polyvinyl alcohol.

The precise structure of both the hot pressed and sintered bodies has not been conclusively established. X-ray diffraction and microscopic examinations of both hot pressed and sintered articles have disclosed the presence of two phases, a primary phase and a secondary phase. The primary phase has been determined to be zirconium diboride with indications of a diboride solid solution. That is, a solid solution of molybdenum into the zirconium diboride. Thus, upon being subjected to pressure and heat during either the hot pressing or cold pressing and sintering operations, the molybdenum disilicide apparently dissociates into molybdenum and silicon, with the molybdenum entering into the primary phase as a solid solution in the zirconium diboride and the silicon entering into the secondary phase. While the structure of the secondary phase has not been conclusively established, it has been determined that this phase contains silicon, boron and carbon. Thus, after hot pressing or sintering the novel composition of this invention, no evidence of the original molybdenum disilicide or boron carbide as such could be found by X-ray diffraction although chemical analysis of the articles shows molybdenum, silicon, boron and carbon present in approximately the original proportions. The primary phase is a continuous phase and is present in major amounts by volume in the refractory bodies. The secondary phase is dispersed in the continuous major phase and is present in minor amounts by volume.

One of the factors contributing to the excellent oxidation resistance of refractory articles and shapes of this invention is the fact that when such hot pressed or sintered articles and shapes are subjected to oxidizing conditions at temperatures of above about 1000° C., an oxide film or barrier forms on the surfaces of the refractory body. This oxide film is composed of zirconia and silica with other oxides as minor constituents. The zirconia in this film contributes refractoriness to the film while the silica provides "self-healing" characteristics. That is, upon being exposed to oxidizing conditions at high temperatures the oxide layer becomes somewhat plastic and flows slightly to repair and seal surface cracks and other surface defects. The plasticity of this oxide layer is effective in reducing oxidation of the refractory bodies at temperatures above about 1000° C.

The following specific examples illustrate more clearly the manner in which the present invention can be carried out, although the invention is not to be construed as being limited to the specific proportions set forth in the examples. The percentages given, unless otherwise specified, are percentages by weight.

*Example I*

A series of mixes was prepared in order to demonstrate the improved oxidation resistance of refractory bodies prepared from mixtures of zirconium diboride, molybdenum disilicide and boron carbide. As a control a similar body was prepared from a mixture of zirconium diboride and molybdenum disilicide, this mixture containing no boron carbide. The compositions of these raw batch mixtures are set forth below.

| Mix No. | $ZrB_2$ (Wt. Percent) | $MoSi_2$ (Wt. Percent) | $B_4C$ (Wt. Percent) |
|---|---|---|---|
| 1 | 87.0 | 13.0 | |
| 2 | 85.0 | 13.0 | 2.0 |
| 3 | 82.9 | 13.0 | 4.1 |
| 4 | 81.1 | 13.0 | 5.9 |

In order to provide a basis for comparison, a standard procedure was followed for making refractory bodies from each of the mixes specified above. The raw materials used in forming each of the above mixes were of high purity, i.e., the $ZrB_2$ was at least 98.5% Zr plus B analysis, the $MoSi_2$ was at least 98.0% Mo plus Si analysis, and the $B_4C$ was at least 98.5% B plus C. The raw materials, minus 325 mesh and finer in each case, were dry mixed in a V blender to obtain an intimate admixture of the materials. The intimately commingled mixture was placed in a graphite mold having a graphite plunger. The assembled mold was placed in a graphite chamber of a high-frequency furnace in an atmosphere of argon and heated to a temperature of 2100° C. in an atmosphere of argon. During the heating of the mold and contents a pressure of 3000 p.s.i. was maintained on the mold plunger, the temperature and pressure being maintained until no further motion of the plunger was noticeable. The furnace was then allowed to cool to room temperature, the pressure being slowly released as the temperature subsided. The refractory bodies formed in this manner were then cut into samples ½″ in diameter x ¼″ thick by means of diamond tools and tested for resistance to oxidation.

In preparation for testing the resistance to oxidation of the specimens, the specimens were carefully weighed and measured. The specimens were then placed in an oxide-lined furnace at the desired test temperature, with air flowing convectively past the samples. The specimens were supported in the furnace across a pair of triangular prisms of zirconia, so that the specimens were exposed on all sides to the oxidizing environment. After the specimens had been held at the test temperature for one-half hour, they were removed from the furnaces and permitted to cool in air. After cooling the specimens were reweighed. The weight change of the specimens expressed in milligrams per square centimeter of specimen area, provided a criterion for the evaluation of oxidation resistance, for a gain in weight is evidence of oxidation due to the formation of oxide products during the test procedure. The results observed are tabulated below.

TABLE 1

| Mix No. | Oxidation Rate (Weight Gain in Mg./cm.$^2$) | | | |
|---|---|---|---|---|
| | 1,500° C | 1,800° C. | 1,950° C. | 2,000° C. |
| 1 | | 13.05 | | 38.7 |
| 2 | | | | 15.23 |
| 3 | | 1.2 | | 16.7 |
| 4 | 4.14 | | 3.96 | 6.05 |

The data of Table 1 clearly shows that the addition of boron carbide to mixtures of zirconium diboride and molybdenum disilicide significantly increases the resistance to oxidation of refractory bodies prepared from such mixtures.

*Example II*

Another series of refractory bodies was hot pressed from the raw batch mixtures set forth in Example I, in order to determine the strength of such bodies. These raw batch mixtures were hot pressed into bodies according to the standard procedure described in Example I. Mixes 1 and 3 were hot pressed according to the modified technique described above in which the pressure was completely removed prior to cooling the furnace; mixes 2 and 4 were hot pressed according to the conventional procedures described in Example I in which the pressure was allowed to slowly subside as the furnace cooled. The bodies formed in this manner were cut into test bars 3″ x ½″ x ¼″.

The strength of the refractory bodies expressed as modulus of rupture (p.s.i.), was determined under standard conditions at room temperature (25° C.) and at 1800° C. The room temperature tests for each specimen were made on a precision breaker. The tests at 1800° C. were made in a graphite breaking jig heated in an induction furnace. In each of the tests a 2½″ span and four point loading was used, the tests being conducted in an argon atmosphere. The results of these tests are shown in Table 2.

TABLE 2

| Mix No. | Modulus of Rupture (p.s.i.) | |
|---|---|---|
| | 25° C. | 1,800° C. |
| 1 | 18,700 | 7,800 |
| 2 | 29,800 | 9,150 |
| 3 | 22,000 | 12,050 |
| 4 | 28,000 | 16,000 |

The results of this test clearly show that the addition of boron carbide to mixtures of zirconium diboride-molybdenum disilicide significantly increases the strength of bodies prepared from such mixtures.

*Example III*

As noted above, refractory articles and shapes of this invention, having excellent resistance to oxidation and improved strength at high temperatures, can also be made by cold pressing and sintering techniques. A series of refractory bodies has been made by cold pressing and sintering raw batch mixtures having the following compositions.

| Mix No. | $ZrB_2$ (Wt. Percent) | $MoSi_2$ (Wt. Percent) | $B_4C$ (Wt. Percent) |
|---|---|---|---|
| 1 | 85.0 | 13.0 | 2.0 |
| 2 | 82.9 | 13.0 | 4.1 |
| 3 | 81.1 | 13.0 | 5.9 |
| 4 | 79.2 | 13.0 | 7.8 |

A standard procedure was followed for making refractory bodies from each of the above raw batch mixtures. In each case, each of the raw materials was ground to a particle size of minus 325 mesh and finer, and an intimate mixture of the dry materials was then formed. One part by weight of a temporary binder was then mixed with this intimate mixture, the temporary binder consisting of a mixture of two resin powders, Vinsol® and Bakelite®. Vinsol® is a by-product of rosin purification and Bakelite® powder is a phenol-formaldehyde resin. A pine oil lubricant was then added to the mixture of refractory materials and binder. This mixture was then loaded in a steel die and pressed at pressures up to 6000 p.s.i. to form shaped bodies. The bodies were then dried for 48 hours at 250° F. and sintered for up to 3 hours at 2100° to 2350° C. The bodies were machined to the desired specimen size using diamond tools. The specimens were then tested under standard conditions to determine resistance to oxidation, according to the test procedure used in Example I, and modulus of rupture, according to the test procedure used in Example II. For determining resistance to oxidation, test specimens ½″ x ½″ x ¼″ were used, and for determining modulus of rupture, test specimens 3″ x ½″ x ¼″ were used. The results observed are tabulated below.

TABLE 3

| Mix No. | Density (gm./cc.) | Oxidation Rate ½ hr. at 1,800° C. (mg./cm.²) | Modulus of Rupture (p.s.i.) | |
|---|---|---|---|---|
| | | | 25° C. | 1,800° C. |
| 1 | 4.92 | 4.60 | 9,800 | 10,000 |
| 2 | 4.97 | 5.75 | 10,250 | 10,900 |
| 3 | 4.85 | 9.60 | 8,500 | 12,200 |
| 4 | 4.60 | 1.15 | 9,200 | 10,000 |

These results clearly show that refractory bodies made from compositions in which boron carbide has been added to a mixture of zirconium diboride and molybdenum disilicide possess excellent resistance to oxidation and good strength at both room temperature and at high temperatures.

In order to demonstrate that the addition of boron carbide to a mixture of zirconium diboride and molybdenum disilicide is unique in unexpectedly increasing the oxidation resistance and strength if bodies formed from such mixtures, a number of compositions have been prepared in which boron carbide, silicon carbide and carbon have been added to mixtures of zirconium diboride and molybdenum disilicide.

*Example IV*

A series of refractory bodies were not pressed from mixtures containing zirconium diboride and molybdenum disilicide. One set of bodies was made from a mixture consisting only of $ZrB_2$—$MoSi_2$; a second set was made from a $ZrB_2$—$MoSi_2$ mixture to which boron carbide had been added; a third set was made from a $ZrB_2$—$MoSi_2$ mixture to which silicon carbide was added; and a fourth set was made from a $ZrB_2$—$MoSi_2$ mixture to which carbin had been added. A standard procedure was used for making and testing each of the refractory bodies. In each case the raw batch mixture contained 90 mole percent $ZrB_2$ and 10 mole percent $MoSi_2$ to which was added the desired amount of additive. The standard hot pressing technique and procedure for determining resistance to oxidation, described in Example I, were followed for making and testing each of the refractory bodies. The results observed are tabulated below, the amount of additive being expressed as parts by weight of additive per 100 parts by weight of zirconium diboride.

TABLE 4

| Mix No. | Additive | Density (gm./cc.) | Oxidation Rate ½ hr. at 1,800° C. (mg./cm.²) |
|---|---|---|---|
| 1 | | 6.08 | 12.40 |
| 2 | 4.11 parts SiC | 5.70 | 12.78 |
| 3 | 2.82 parts $C_4$ | 5.71 | 9.62 |
| 4 | 4.88 parts $B_4C$ | 5.53 | 1.29 |

The results of this test clearly show that the bodies made from compositions containing $ZrB_2$—$MoSi_2$ and $B_4C$ additive had outstanding resistance to oxidation.

*Example V*

Another series of refractory bodies was hot pressed from $ZrB_2$—$MoSi_2$ compositions to which additives of $B_4C$ and SiC had been added, in order to determine the effect of these additives on the resulting hot pressed bodies. In each case the raw batch mixture contained 90 mole percent $ZrB_2$ and 10 mole percent $MoSi_2$ together with the desired amount of additive. The bodies were made and tested under uniform, standard conditions, the bodies being formed according to the hot pressing process of Example I and tested according to the test procedure described in Example II. The results of these tests are tabulated in Table 5, the amount of additive being expressed as parts by weight of additive per 100 parts by weight of zirconium diboride.

TABLE 5

| Mix No. | Additive | Density (gm./cc.) | Modulus of Rupture (p.s.i.) | |
|---|---|---|---|---|
| | | | 25° C. | 1,800° C. |
| 1 | | 6.08 | 16,600 | 7,780 |
| 2 | 2.44 parts $B_4C$ | | 29,800 | 9,150 |
| 3 | 2.44 parts $B_4C$ / 2.06 parts SiC | 5.77 | 30,080 | 9,080 |
| 4 | 2.44 parts $B_4C$ / 6.17 parts SiC | 5.69 | 29,860 | 9,170 |
| 5 | 7.32 parts $B_4C$ | | 28,000 | 16,600 |
| 6 | 7.32 parts $B_4C$ / 2.06 parts SiC | 5.53 | 22,720 | 16,724 |
| 7 | 7.23 parts $B_4C$ / 6.17 parts SiC | 5.48 | 28,680 | 16,540 |

The data of Table 5 clearly shows that the addition of silicon carbide has no significant effect on the strength of refractory bodies made from such compositions. This is evident from a comparison of mixes 2, 3 and 4 as well as mixes 5, 6 and 7. In both of these cases the amount of boron carbide additive was constant while the amount of silicon carbide additive was varied.

In addition to the properties and characteristics noted above, it has also been determined that refractory bodies made from a raw batch mixture of 90 mole percent $ZrB_2$ and 10 mole percent $MoSi_2$ to which $B_4C$ has been added, have a compressive strength of about 222,000 p.s.i. for hot pressed bodies and about 72,000 p.s.i. for sintered bodies.

As noted above, the novel composition of this invention may also be used as a protective coating on another oxidizable material. Thus, a mixture containing from about 70% to 94% by weight zirconium diboride, from about 5% to 20% by weight molybdenum disilicide and from about 1% to 10% by weight of boron carbide may be applied to a cellular or other refractory articles or on one or more surfaces thereof, by arc-spraying, flame-spraying or any other suitable means of physically applying the mixture to the surface of the article. Either during the application of the coating or subsequently thereto, it is heated to a suitable sintering temperature.

It will be understood that the details and examples given hereinbefore are by way of illustration only and not by way of limitation of the invention. Thus, the refractory compositions and articles of this invention are not to be limited to the compositions given by way of illustration in the specific examples. Rather, refractory articles and shapes having excellent resistance to oxidation may be made from compositions containing from about 70% to about 94% by weight zirconium diboride, from about 5% to about 20% by weight of molybdenum disilicide and from about 1% to about 10% by weight of boron carbide. Compositions having this range of proportions of raw material may be successfully hot pressed or sintered into suitable articles or shapes.

It is also to be understood that the articles and shapes of the present invention are not limited to any specific field or field of use. They are particularly well suited for applications in which high temperatures and oxidizing conditions are encountered. Satisfactory articles and shapes which have already been successfully fabricated from the novel compositions of this invention include rocket nozzles and electrode tips. Other suitable high temperature applications include, for example, leading edges for rocket and re-entry vehicles, combustion chambers, turbine blades, thermocouple protection tubes, and the like. They are also suitable for the fabrication of laboratory ware, including combustion boats, crucibles, burner holders and other shapes.

While the invention has been described in connection with specific embodiments thereof, it will be understood that it is capable of further modifications, and this application is intended to cover any variations, uses or adaptations of the invention following the principles of the invention and including such departures from the present disclosure as come within known or customary practice in the art to which the invention pertains and as may be applied to the essential features hereinbefore set forth, or as fall within the scope of the appended claims.

We claim:

1. A composition of matter consisting essentially of from about 70% to about 94% by weight zirconium diboride, from about 5% to about 20% by weight molybdenum disilicide and from about 1% to about 10% by weight of boron carbide.

2. A raw mix for the manufacture of shaped refractory bodies, said raw mix comprising an intimately commingled mixture consisting essentially of zirconium diboride, molybdenum disilicide and from about 1% to about 10% by weight of boron carbide.

3. A raw mix for the manufacture of shaped refractory bodies, said raw mix comprising an intimately commingled mixture of finely divided material consisting essentially of from about 70% to about 94% by weight of zirconium diboride, from about 5% to about 20% by weight of molybdenum disilicide, and from about 1% to about 10% by weight of boron carbide.

4. The raw mix defined in claim 3 in which said finely divided material has a particle size of minus 325 mesh and finer.

5. The raw mix defined in claim 3 in which said raw mix consists essentially of said finely divided material and a temporary binder.

6. A raw mix for the manufacture of shaped refractory bodies, said raw mix comprising an intimately commingled mixture of finely divided material consisting essentially of about 90 mole percent zirconium diboride, about 10 mole percent molybdenum disilicide and from about 2.0 to about 10.0 parts by weight of boron carbide per 100 parts by weight of zirconium diboride.

7. A method for making a refractory body comprising preparing a shape from a raw batch mixture comprising zirconium diboride, modybdenum disilicide and boron carbide, the boron carbide being present in an amount of from about 1% to about 10% by weight of said mixture, and subjecting said shape to pressure and heat in a non-oxidizing atmosphere to form a self-bonded body.

8. A method for making a refractory body comprising preparing a raw batch mixture consisting essentially of zirconium diboride, molybdenum disilicide and from about 1% to about 10% by weight of boron carbide, placing said raw batch mixture in a mold and hot pressing said mixture in a non-oxidizing atmosphere at a pressure of at least about 2000 p.s.i. and at a temperature of at least about 2000° C. for a time sufficient to form a self-bonded body.

9. The method defined in claim 8 in which said raw batch mixture consists essentially of from about 70% to about 94% by weight of zirconium diboride, from about 5% to about 20% by weight of molybdenum disilicide and from about 1% to about 10% by weight of boron carbide.

10. The method defined in claim 8 in which the pressure is applied at the maximum temperature, the pressure and temperature being maintained for a period of time sufficient to form a self-bonded body of the desired density, the pressure then being slowly released as the temperature decreases.

11. The method as defined in claim 8 in which the pressure is applied at the maximum temperature, the pressure and temperature being maintained for a period of time sufficient to form a self-bonded body of the desired density, the pressure then being substantially completely removed before the temperature decreases.

12. A method of making a refractory body which comprises molding an article of a desired shape from a mixture comprising zirconium diboride, molybdenum disilicide and from about 1% to about 10% by weight of boron carbide, and sintering said shape in a non-oxidizing atmosphere at a temperature of at least about 2000° C.

13. A method of making refractory bodies which comprises forming an intimate admixture consisting essentially of from about 70% to about 94% by weight of zirconium diboride, from about 5% to about 20% by weight of molybdenum disilicide and from about 1% to about 10% by weight of boron carbide, loading said mixture in a mold, pressing said mixture at pressures up to 50,000 p.s.i. to form a body and sintering said body in a non-oxidizing atmosphere at a temperature of at least about 2000° C. for a period of time ranging from 1 to 10 hours.

14. A method of forming a composite refractory body having excellent resistance to oxidation and good strength at high temperatures, said method comprising coating a refractory substrate material with a mixture consisting essentially of from about 70% to about 94% by weight of zirconium diboride, from about 5% to about 20% by weight of molybdenum disilicide and from about 1% to about 10% by weight of boron carbide, and sintering said coated body in a non-oxidizing atmosphere.

15. A refractory body formed from a raw batch mixture comprising zirconium diboride, molybdenum disilicide and boron carbide, said body comprising a primary phase and a secondary phase, said primary phase consisting essentially of a solid solution of molybdenum in zirconium diboride and said second phase containing silicon, boron and carbon.

16. A refractory body having excellent resistance to oxidation and good strength at high temperatures, said body consisting essentially of a primary phase comprising a solid solution of molybdenum in zirconium diboride and a secondary phase which contains boron, silicon and carbon.

17. The body defined in claim 16 in which said primary phase is a continuous phase and is present in a major amount by volume, and said secondary phase is dispersed in said primary phase and is present in a minor amount by volume.

References Cited

UNITED STATES PATENTS

| Re. 23,789 | 2/1954 | Montgomery | 106—43 |
| 2,776,141 | 10/1956 | Nicholson | 106—57 |
| 2,862,828 | 12/1958 | Glaser | 106—57 |

FOREIGN PATENTS

| 478,016 | 1/1938 | Great Britain. |

HELEN M. McCARTHY, *Primary Examiner.*

TOBIAS E. LEVOW, *Examiner.*